(No Model.)
J. M. LUCAS.
PNEUMATIC TIRE.
No. 598,613.　　　　　　　　　Patented Feb. 8, 1898.
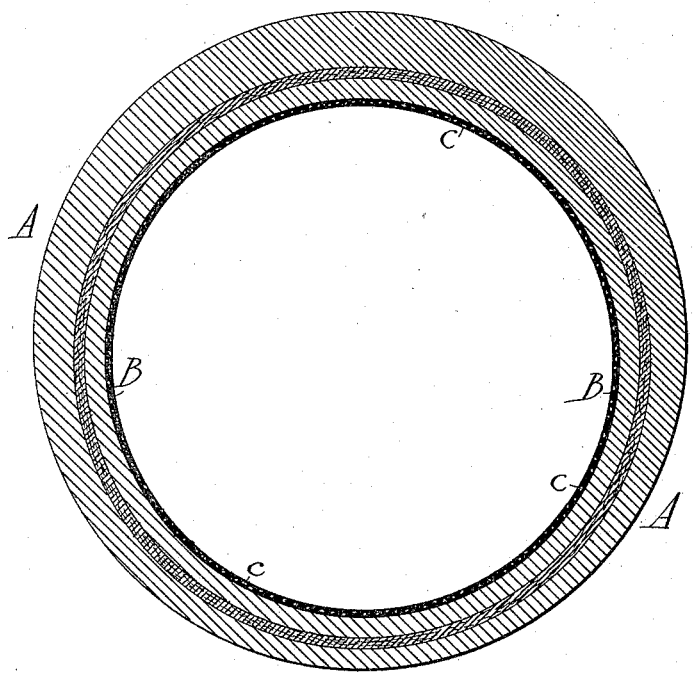
Witnesses
S. E. Zimmerman
W. J. Norton
Inventor
John M. Lucas
By　　　　　　
his Attorneys

UNITED STATES PATENT OFFICE.

JOHN M. LUCAS, OF LINCOLN, NEBRASKA.

PNEUMATIC TIRE.

SPECIFICATION forming part of Letters Patent No. 598,613, dated February 8, 1898.

Application filed November 5, 1896. Serial No. 611,147. (No model.)

*To all whom it may concern:*

Be it known that I, JOHN M. LUCAS, a citizen of the United States, residing at Lincoln, in the county of Lancaster and State of Nebraska, have invented certain new and useful Improvements in Pneumatic Tires; and I do declare the following to be a full, clear, and exact description of the invention, such as will enable others skilled in the art to which it appertains to make and use the same, reference being had to the accompanying drawing, and to the letters of reference marked thereon, which forms a part of this specification.

My invention relates to improvements in pneumatic tires, and is directed more particularly to means for repairing or healing pneumatic-tire punctures.

My invention provides a pneumatic tire which is self-healing, the means employed for repairing the same being carried by the tire and operating mechanically to close punctures therein before deflation can take place.

My invention consists of a pneumatic tire in the interior of which is a coating consisting of a semisolid viscous substance of permanent fluidity, and hence constantly movable, which substance, in the event of a puncture, is forced by the outward pressure of the air thereon into such puncture to form a closure; also, in connection with the said coating, of solid particles which are under suspension therein and which, with the substance forming the coating, are forced into a puncture to heal the same; also, in connection with the said coating, of a solvent for controlling the degree of fluidity of the substance of said coating.

My invention will be fully apparent from a reading of the following description, and in connection with such description attention is directed to the accompanying drawing, in which is shown in cross-section a portion of a pneumatic tire embodying my invention, the tire being designated by the letter A, the coating by B, and the solid particles by c c.

The tire A may be of any construction which will allow of inflation with air, and the coating B may be provided either before or after the tire is applied to a wheel, as the substance forming the coating is injected into the tire through the valve-opening and preferably by the use of a syringe. The substance composing the coating is employed in quantity sufficient only to form a thin covering for the entire inner surface of the tire. I employ a substance such as molasses or molasses mixed with some other substance—such as gum-arabic, gum-tragacanth, liquid glue, or mucilage—and which has a viscous property and is non-driable or of permanent fluidity, and hence constantly movable. The semisolid consistency of the substance precludes of its flowing entirely through fine punctures, such as will allow of deflation, and hence it may be said to choke such punctures or, in other words, to obstruct the otherwise clear passage of the air therethrough. The substance which coats the entire inner surface of the tire is, in the event of a puncture, forced by the contained air thereinto, the substance being in the first instance interposed between the body of air and the surface of the tire, as clearly apparent, and as a result the puncture is closed or healed by providing an obstruction to the passage of the air.

The substance alone is capable of closing small or fine punctures, but for larger punctures I employ small solid particles, such as sawdust, which are mixed with and held under suspension in the substance and which are forced with the substance by the pressure of the air into such larger punctures to form a closure thereof. When employing the substance and the particles, the proportion is about twenty parts of the former to about five parts of the latter. Any equivalent of sawdust may be employed, such as ground cork, cornmeal, or coarsely-ground corn. The substance, or the substance and the contained particles, may be employed to equal advantage in repairing tires which have become punctured previously to being coated, in which case the coating is applied by injection to the deflated tire, after which inflation may take place. In this instance the operation of closing the puncture is the same as above stated.

The substance, as before stated, is of semisolid consistency, and its fluidity will be preserved for a comparatively great length of time. In the event, however, that the substance after lapse of time should through impurity or other cause lose somewhat its semisolid condition the proper consistency may be restored by the injection into the tire of a solvent—such as glycerin or water, or glycerin and water—which by admixture with the substance will bring the latter to its original degree of effectiveness.

The carrying of my invention into effect is attended with small expense when compared with previous methods employed to prevent or remedy punctures and does not add materially to the cost of a tire. Moreover, the repairing by my invention of a previously-punctured tire occupies but the minimum of time and labor—much less, in fact, than is expended in the operation of inflation.

I claim as my invention—

1. A pneumatic tire having therein a constantly-movable coating of molasses or its described equivalent, and solid particles consisting of sawdust or its described equivalent held under suspension in said coating, for the purpose set forth.

2. A pneumatic tire having therein a constantly-movable coating consisting of molasses or its described equivalent, and a solvent therefor consisting of glycerin or its described equivalent.

In testimony whereof I affix my signature in presence of two witnesses.

JOHN M. LUCAS.

Witnesses:
M. L. EASTERDAY,
A. W. EASTERDAY.